United States Patent
Suttmann et al.

(10) Patent No.: US 10,297,059 B2
(45) Date of Patent: May 21, 2019

(54) METHOD AND IMAGE PROCESSOR FOR SENDING A COMBINED IMAGE TO HUMAN VERSUS MACHINE CONSUMERS

(71) Applicant: MOTOROLA SOLUTIONS, INC, Chicago, IL (US)

(72) Inventors: Karen Suttmann, Lake Zurich, IL (US); Stanko Jelavic, Davie, FL (US)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 25 days.

(21) Appl. No.: 15/386,239

(22) Filed: Dec. 21, 2016

(65) Prior Publication Data

US 2018/0174342 A1 Jun. 21, 2018

(51) Int. Cl.
*G06T 3/40* (2006.01)
*G06T 11/60* (2006.01)
*G06K 9/00* (2006.01)

(52) U.S. Cl.
CPC .......... *G06T 11/60* (2013.01); *G06K 9/00228* (2013.01); *G06K 9/00771* (2013.01); *G06T 3/4038* (2013.01); *G06T 2207/20221* (2013.01); *G06T 2207/30201* (2013.01)

(58) Field of Classification Search
CPC ................ G06K 9/00228; G06T 11/60; G06T 2207/20221; G06T 2207/30201
See application file for complete search history.

(56) References Cited

U.S. PATENT DOCUMENTS

| | | | |
|---|---|---|---|
| 6,184,926 B1 | 2/2001 | Khosravi et al. | |
| 6,790,507 B1 | 9/2004 | Claeys | |
| 6,832,102 B2 | 12/2004 | Anson | |
| 7,123,754 B2 | 10/2006 | Matsuo et al. | |
| 7,486,826 B2 | 2/2009 | Sung et al. | |
| 7,634,662 B2 | 12/2009 | Monroe | |
| 7,751,805 B2 | 7/2010 | Neven et al. | |
| 7,756,778 B1 * | 7/2010 | Downey | G06Q 40/00 705/35 |

(Continued)

FOREIGN PATENT DOCUMENTS

| | | |
|---|---|---|
| GB | 2452025 | 2/2009 |
| WO | 2013074233 A1 | 5/2013 |
| WO | 2014001610 A1 | 1/2014 |

OTHER PUBLICATIONS

"Gulcin Caner et al.; Super Resolution Recovery for Multi-Camera Surveillance Imaging; 2003; pp. 109-112 Website Address: http://www.mirlab.org/conference_papers/International_Conference/ICME%202003/pdfs/0100109.pdf".

(Continued)

*Primary Examiner* — Yubin Hung (57) ABSTRACT

An image processor provides a combined image of an object from first and second cameras. The image processor receives a first image from a first camera and a second image from a second camera. The first and second images each include a field of view and metadata associated with the image. The image processor determines whether a combined image of the first and second images will be viewed by a person or a machine. If the combined image is to be processed by a machine, the first and second metadata are included with the combined image and sent to the machine. If the combined image is to be viewed by a person, the combined image includes a subset of the metadata so that the image is not too large or too cluttered.

7 Claims, 6 Drawing Sheets

(56) References Cited

U.S. PATENT DOCUMENTS

| | | | |
|---|---|---|---|
| 7,806,604 B2 | 10/2010 | Bazakos et al. | |
| 7,835,552 B2 | 11/2010 | Doi | |
| 8,015,135 B2 | 9/2011 | Menich | |
| 8,116,534 B2 | 2/2012 | Nishiyama et al. | |
| 8,244,002 B2 | 8/2012 | Chen et al. | |
| 8,428,391 B2 | 4/2013 | Park | |
| 8,484,693 B2 | 7/2013 | Cox et al. | |
| 8,488,913 B2 | 7/2013 | Lin et al. | |
| 8,504,640 B2 | 8/2013 | Rios et al. | |
| 8,587,661 B2 | 11/2013 | McCubbrey | |
| 8,625,860 B2 | 1/2014 | Kveton et al. | |
| 8,639,645 B2 | 1/2014 | Deshpande et al. | |
| 8,682,109 B2 | 3/2014 | Kang et al. | |
| 8,831,380 B2 | 9/2014 | Ofek et al. | |
| 9,036,001 B2 | 5/2015 | Chuang et al. | |
| 9,063,930 B2 | 6/2015 | Zadeh | |
| 9,094,615 B2 | 7/2015 | Aman et al. | |
| 9,311,962 B2 | 4/2016 | Harradine et al. | |
| 9,432,581 B2* | 8/2016 | Nakamura | G06K 9/00308 |
| 2005/0093976 A1 | 5/2005 | Valleriano et al. | |
| 2005/0185047 A1 | 8/2005 | Hii | |
| 2007/0083762 A1* | 4/2007 | Martinez | G06F 17/30026 |
| | | | 713/176 |
| 2007/0250898 A1 | 10/2007 | Scanlon et al. | |
| 2008/0298643 A1 | 12/2008 | Lawther et al. | |
| 2009/0043812 A1 | 2/2009 | Rigdon | |
| 2010/0026809 A1 | 2/2010 | Curry | |
| 2010/0329568 A1 | 12/2010 | Gamliel et al. | |
| 2011/0044549 A1 | 2/2011 | Bressan | |
| 2011/0080487 A1 | 4/2011 | Venkataraman et al. | |
| 2011/0136502 A1* | 6/2011 | Hubner | H04W 4/02 |
| | | | 455/456.1 |
| 2011/0285845 A1 | 11/2011 | Bedros et al. | |
| 2012/0092494 A1* | 4/2012 | Garoutte | G08B 13/19608 |
| | | | 348/143 |
| 2012/0169882 A1 | 7/2012 | Millar et al. | |
| 2012/0242840 A1 | 9/2012 | Nakfour et al. | |
| 2012/0327172 A1* | 12/2012 | El-Saban | G06K 9/00228 |
| | | | 348/14.02 |
| 2013/0031041 A1 | 1/2013 | Maciejewski et al. | |
| 2013/0169781 A1* | 7/2013 | Hanina | G06K 9/00335 |
| | | | 348/77 |
| 2013/0174195 A1* | 7/2013 | Witenstein-Weaver | H04N 21/4722 |
| | | | 725/32 |
| 2013/0202162 A1 | 8/2013 | Kim et al. | |
| 2014/0063236 A1 | 3/2014 | Shreve et al. | |
| 2014/0018899 A1 | 7/2014 | Klein | |
| 2014/0280538 A1 | 9/2014 | Oswald | |
| 2015/0092109 A1 | 4/2015 | Mo et al. | |
| 2015/0138190 A1 | 5/2015 | Holzer et al. | |
| 2015/0238073 A1 | 8/2015 | Charles et al. | |
| 2016/0179954 A1* | 6/2016 | Khanzode | G06F 17/30038 |
| | | | 707/723 |
| 2016/0316219 A1* | 10/2016 | Yuan | H04N 21/435 |
| 2017/0109940 A1* | 4/2017 | Guo | G06T 19/20 |
| 2017/0264882 A1* | 9/2017 | Helberg | H04N 5/33 |

OTHER PUBLICATIONS

"Chih-Chung Hsu et al.; Cooperative Face Hallucination Using Multiple References; Jun. 28, 2009-Jul. 3, 2009; pp. 818-821 Website Address: http://ieeexplore.ieee.org/xpls/abs_all.jsp?arnumber=5202620".

"Shigeru Imai.; Task Offloading Between Smartphones and Distributed Computational Resources; May 2012; pp. 1-44 Website Address: http://wcl.cs.rpi.edu/theses/imaishigeru-master.pdf ".

"Serrano et al.; Compression for Distributed Face Recognition;May 2014; Website Address: http://cose-stor.sfsu.edu/~kazokada/research/okada_mmua03_facereccomp.pdf".

"Yan et al.; Distributed wireless face recognition system; Jan. 27, 2008 Website Address: http://proceedings.spiedigitallibrary.org/proceeding.aspx?articleid=812702".

Libin Sun et al.: "Super-resolution from internet-scale scene matching", 2012 IEEE International Conference on Computational Photography (ICCP), Apr. 1, 2012, all pages.

Andrej Mikulik, Ondrej Chum, Jiri Matas: "Image Retrieval for Online Browsing in Large Image Collections", In: "Lecture Notes in Computer Science", Oct. 2, 2013, Springer Berlin Heidelberg, all pages.

Kamal Nasrollahi et al.: "Super-resolution: a comprehensive survey", Machine Vision and Applications, vol. 25, No. 6, Aug. 1, 2014, all pages.

* cited by examiner

METHOD AND IMAGE PROCESSOR FOR SENDING A COMBINED IMAGE TO HUMAN VERSUS MACHINE CONSUMERS

BACKGROUND OF THE INVENTION

In certain scenarios, such as law enforcement, cameras record images to assist in surveillance and apprehension of subjects. The cameras can be still-image cameras or video cameras.

At times multiple cameras are used to capture images of a scene. Since the cameras will necessarily be located in different locations, they will have a different perspective on the scene. This can be advantageous, as a subject may be hidden from the field of view of a first camera while within the field of view of a second camera. Law enforcement officers or others can then review these images to get a more accurate and detailed picture of the scene.

Images, whether taken by a still camera or a video camera, include metadata. Metadata is data that describes other data. Metadata is generally in digital readable form, so it can only be read and processed by a digital processor, but not in its native form by a person. Including image elements and metadata from multiple images into a combined image that is to be viewed by a person can make the image excessively large, complex, and hard to process and transmit.

Therefore a need exists for a method that allows multiple images to be stacked while not making the stacked image overly complex when the intended target is a person.

BRIEF DESCRIPTION OF THE SEVERAL VIEWS OF THE DRAWINGS

The accompanying figures, where like reference numerals refer to identical or functionally similar elements throughout the separate views, which together with the detailed description below are incorporated in and form part of the specification and serve to further illustrate various embodiments of concepts that include the claimed invention, and to explain various principles and advantages of those embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

Disclosed is an improved method and image processor for creating a combined image from a first image and a second image. In accordance with an exemplary embodiment of the present invention, an image processor receives a first image from a first camera having a first field of view of a scene. The first image preferably includes first metadata associated with the first image. The image processor receives a second image from a second camera having a second field of view of the scene, the second field of view is different from the first field of view. The second image includes second metadata associated with the second image.

The image processor determines whether a combined image of the scene is to be processed by a human user or a machine processor. The image processor combines the first image with the second image to form the combined image. The combined image preferably includes all of the first metadata and all of the second metadata if the combined image is to be processed by a machine processor, and wherein the combined image includes a subset of the first metadata and the second metadata if the combined image is to be processed by a human user.

As examples of scenarios where an exemplary embodiment can be used, as a suspect hides behind an object, such as a bush, a tree, or a house, two cameras may be able to view different portions of the scene. A first camera may be able to see, for example, the suspect's face but not what is in the suspect's hand, while a second camera may be able to see what is in the suspect's hand, but not the suspect's face. An image processor preferably combines images from the first and the second cameras, and includes in the combined image both the face of the suspect from the first image and the gun from the second image.

The image processor is also able to know, preferably from metadata included with the images, whether the intended recipient of the combined image is a person or a computing device. If the combined image is to be viewed by a person, only desired image elements and associated metadata is included in the combined image. If the image is to be processed by a computing device, all image elements and all metadata from the first image and the second image is preferably included in the combined image.

Figure 1:
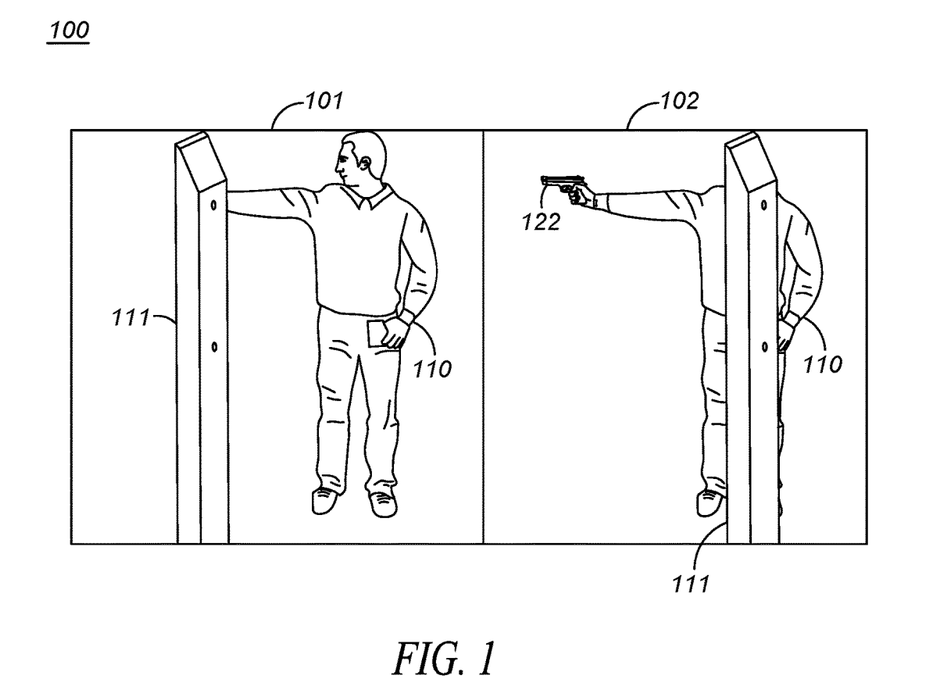
FIG. 1 is a diagram depicting a first image and a second image in accordance with an exemplary embodiment of the present invention.

FIG. 1 is a diagram 100 depicting a first image 101 and a second image 102 in accordance with an exemplary embodiment of the present invention. It should be understood that first image 101 and second image 102 are simplified depictions of an image. An actual image would include additional details, objects, etc., but these simplified images are depicted in order to facilitate a better understanding of this invention.

First image 101 is imaged using a first camera, not shown. First image 101 can be a single picture, multiple pictures, or a video stream. In the exemplary embodiment depicted in FIG. 1, first image 101 is shot from a first field of view and includes a person 110 and a post 111.

Second image 102 is imaged using a second camera, not shown. Second image 102 can be a single picture, multiple pictures, or a video stream, but in an exemplary embodiment is the same format as first image 101. In the exemplary embodiment depicted in FIG. 1, second image 102 is shot from a second field of view and includes a partial view of person 110, and full views of post 111 and gun 122.

Figure 2:
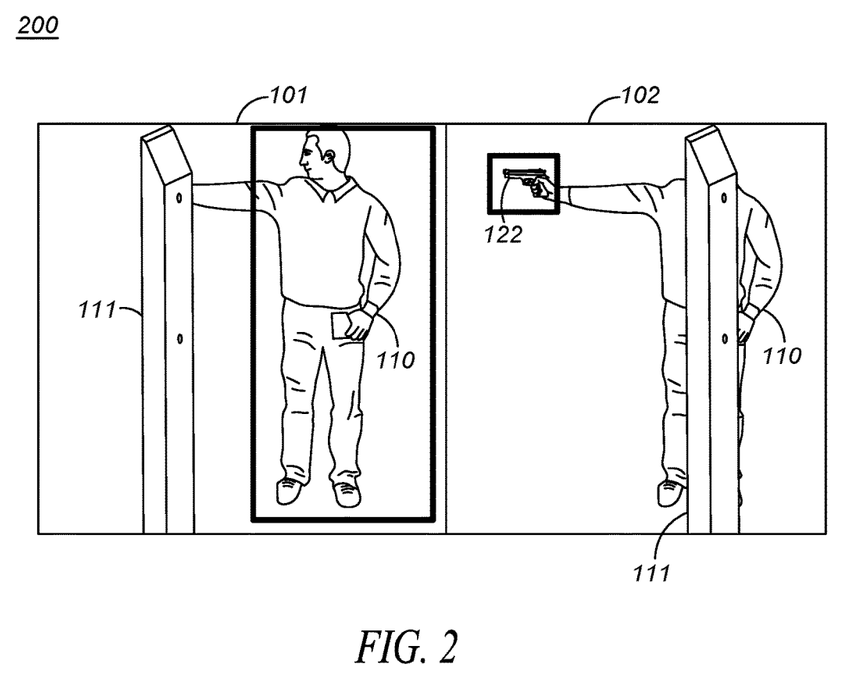
FIG. 2 is a diagram depicting a first image and a second image after object recognition processing in accordance with an exemplary embodiment of the present invention.

FIG. 2 is a diagram 200 depicting first image 101 and second image 102 after object recognition processing in accordance with an exemplary embodiment of the present invention.

Recognition software processes first image 101 and second image 102. In an exemplary embodiment, the recognition software identifies person 110 from first image 101 and gun 122 from second image 102. The recognition software makes these identifications and is aware that each of these identified elements are only visible in one of the images. The image processor combines first image 101 and second image 102 into a combined image, and preferably includes person 110 and gun 122 in the combined image.

Figure 3:
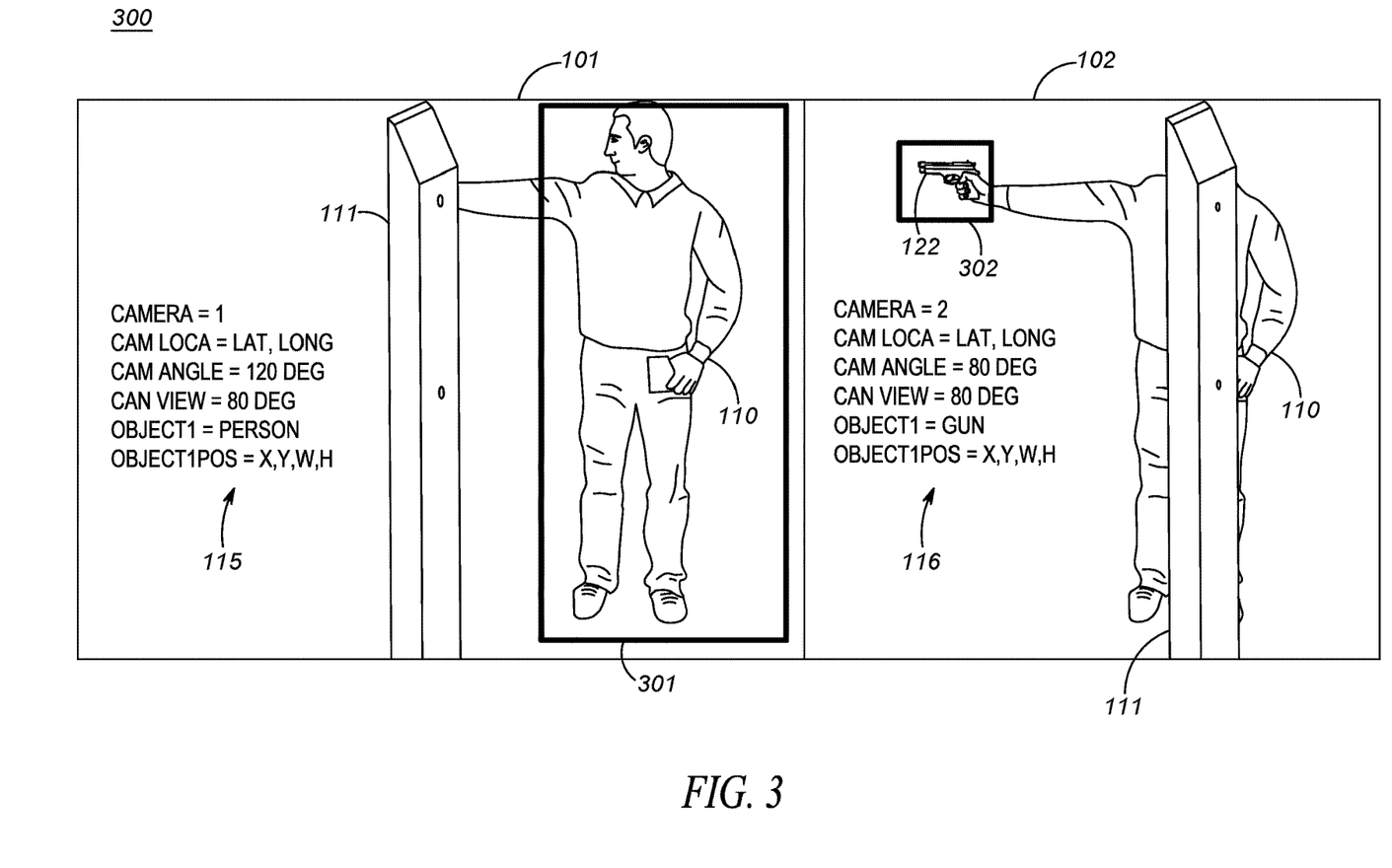
FIG. 3 is a diagram depicting the first image and the second image and metadata associated with the first image and the second image in accordance with an exemplary embodiment of the present invention.

FIG. 3 is a diagram depicting first image 101 and second image 102 and metadata 115 and 116 associated with the first image and the second image in accordance with an exemplary embodiment of the present invention. Each image is preferably tagged with metadata that each source camera stores with the image. The metadata can be derived from object detection or from context data available to the source camera.

First image 101 includes first element 301, which in this exemplary embodiment is associated with person 110. Second image 102 includes second element 302, which in this exemplary embodiment is associated with gun 122.

First metadata 115 relates to first image 101. It should be understood that there could be several additional metadata fields, but only a few of them are described in this specification for clarity purposes. In accordance with an exemplary embodiment, first metadata 115 includes a camera identification field, a camera location field, a camera angle field, a view field, a first object field, and a first object position field. It should be understood that first metadata can also include various additional fields as well. The camera identification field identifies the camera that took the picture. The camera location field preferably includes the latitude and longitude of the camera when taking the image. The camera angle field stores the angle of the camera when taking the first image. The view field is the field of view visible by the camera. The first object field includes the first element 301 that is included in first image 101, in this exemplary embodiment person 110. The first object position field includes the coordinates of person 110.

Second metadata 116 relates to second image 102. In accordance with an exemplary embodiment, second metadata 116 includes a camera identification field, a camera location field, a camera angle field, a view field, a first object field, and a first object position field. It should be understood that second metadata can also include various additional fields as well. The camera identification field identifies the camera that took the picture. The camera location field preferably includes the latitude and longitude of the camera when taking the image. The camera angle field stores the angle of the camera when taking the first image. The view field is the field of view visible by the camera. The first object field includes the first element 302 that is included in second image 102, in this exemplary embodiment gun 122. The first object position field includes the coordinates of gun 122.

Figure 4:
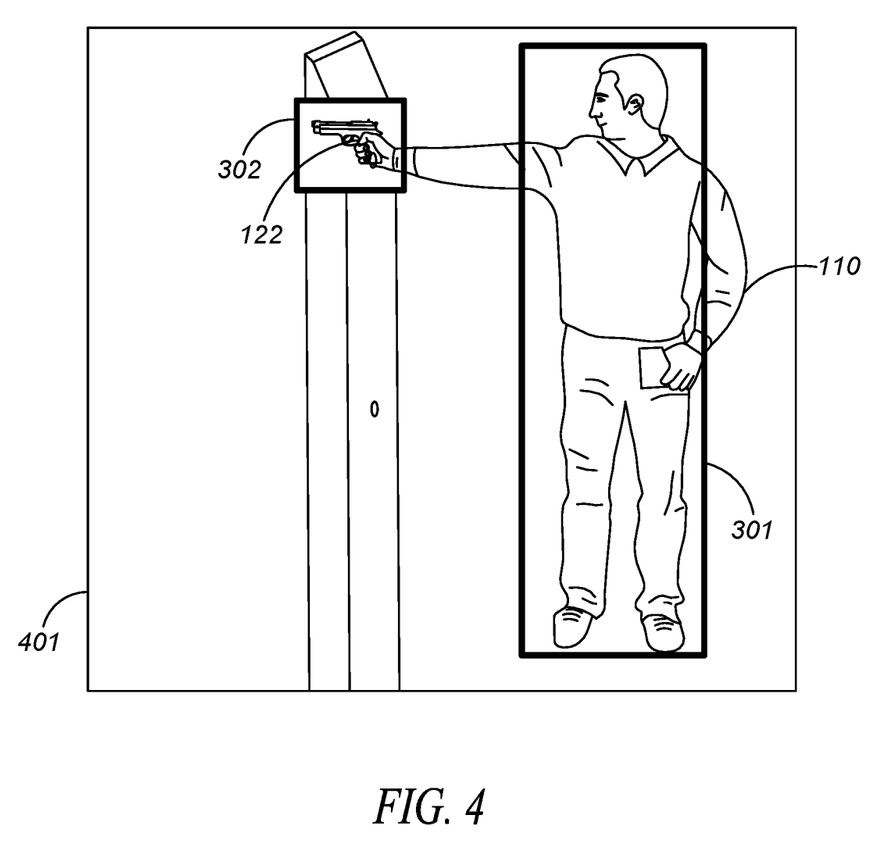
FIG. 4 is a diagram depicting a combined image for human viewing in accordance with an exemplary embodiment of the present invention.

FIG. 4 is a diagram depicting a combined image 401 for human viewing in accordance with an exemplary embodiment of the present invention. Combined image 401 includes first element 301 and second element 302 combined in such a way that the two elements are included in a single image, in particular combined image 401.

Figure 5:
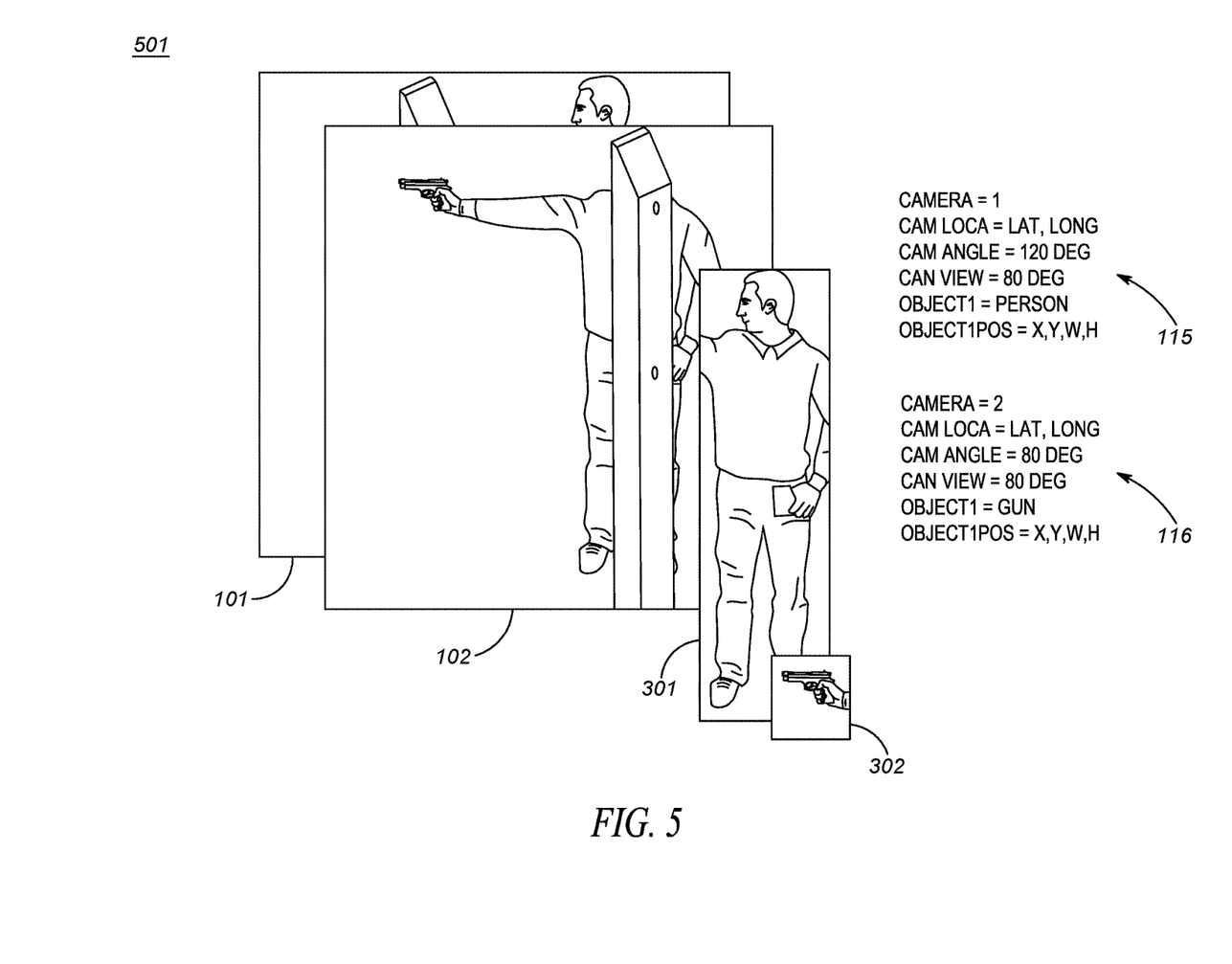
FIG. 5 is a diagram depicting a combined image for machine viewing in accordance with an exemplary embodiment of the present invention.

FIG. 5 is a diagram depicting a combined image 501 for machine viewing in accordance with an exemplary embodiment of the present invention. Combined image 501, because it is not intended to be viewed by a human but rather by an electronic processing device, includes first image 101, second image 102, first element 301, second element 302, first metadata 115, and second metadata 116.

Figure 6:
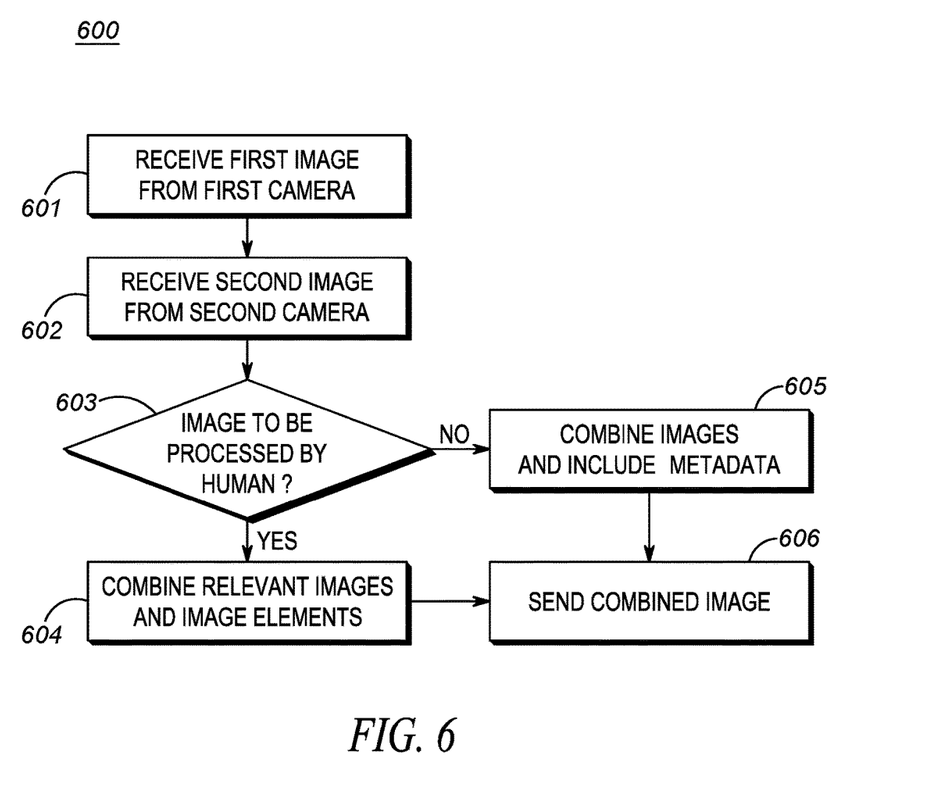
FIG. 6 depicts a flowchart of a method for providing a combined image of an object from first and second cameras at an image processing device in accordance with an exemplary embodiment of the present invention.

FIG. 6 depicts a flowchart of a method for providing a combined image of an object from first and second cameras at an image processing device in accordance with an exemplary embodiment of the present invention. In accordance with an exemplary embodiment, the image processing device is a combiner that performs image or video stacking.

An image processor receives (601) a first image from a first camera. In accordance with an exemplary embodiment, the first image includes multiple elements in a scene as well as metadata relating to the first image.

The image processor receives (602) a second image from a second camera. In accordance with the exemplary embodiment, the second image includes multiple elements of the same scene as the first image, as well as metadata relating to the second image. In accordance with this exemplary embodiment, the second image includes elements that are also in the first image but at least one element that is not included in the first image.

The image processor determines (603) if the image is to be processed by a human. A human reviewing an image requires different elements than a computer or other electronic processor. In accordance with an exemplary embodiment, the image processor makes this determination utilizing metadata from the images.

If the image is to be reviewed by a human, the image processor combines (604) the relevant images from the first image and the second image to form a combined image and includes a subset of the metadata of the first image and the second image with the combined image. This is preferably accomplished utilizing the metadata of the images as a guide.

In accordance with an exemplary embodiment, the image processor can utilize ranking of certain images as being of higher importance than other images. This would allow the image processor to prioritize images from these images as more likely to be included in the combined image than other images. In accordance with a further exemplary embodiment, the image processor can rank elements based on their significance. For example, a gun or other weapon can have a higher ranking than other elements.

In accordance with an exemplary embodiment, the image processor will know the viewing technology that will be used by the person viewing the image and will adjust the settings of the combined image accordingly. For example, the resolution could be different if the viewer will be viewing the combined image on a computer screen (higher resolution) as opposed to a smartphone or augmented reality classes (lower resolution). The image processor could also adjust other aspects of the combined image, for example the contrast or transparency of the combined image.

The image processor can also process facial images uniquely. For example, if an image includes the face of a suspect, the combiner can include the facial image and apply the facial image to the image of the whole scene. In the scenario when there are multiple images of a suspect's face taken from different angles, the combiner can include each of these images in the combined image, to give the human reviewer multiple perspectives and views of the suspect's face. In accordance with an exemplary embodiment, when the image processor determines that an element represents a facial image, additional processing is done to make the image of the face sharper.

If the image processor determines at step 603 that the combined image is not to be processed by a human, the image processor combines (605) all elements of the first image with all elements of the second image and preferably includes all the metadata from both the first image and the second image in the combined image and it is left to the destination machine to decide how to process the combined image.

The image processor then sends (606) the combined image to the desired human or electronic processor.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized electronic processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising an electronic processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method for providing a combined image of an object from first and second cameras at an image processing device, the method comprising:
   receiving a first image from a first camera having a first field of view of a scene, wherein the first image includes first metadata associated with the first image;
   receiving a second image from a second camera having a second field of view of the scene, wherein the second field of view is different from the first field of view, and wherein the second image includes second metadata associated with the second image;
   determining whether a combined image of the scene is to be processed by a human user or a machine processor; and
   combining the first image with the second image to form the combined image, and wherein the combined image includes metadata that varies based on whether or not the combined image is to be sent to a human or to a machine processor, such that metadata comprises the first metadata and the second metadata when the combined image is to be processed by the machine processor, and wherein the metadata comprises a subset of the first metadata and the second metadata when the combined image is to be processed by a human user.

2. The method of claim 1, wherein the step of determining whether a combined image of the scene is to be processed by a human user or a machine processor comprises using either the first metadata or the second metadata to make the determination.

3. The method of claim 1, the method further comprising the step of adjusting at least one of a position of the combined image, a resolution of the combined image, an opacity of the combined image, and a layer of the combined image.

4. The method of claim 1, wherein the combined image includes a first element from the first image and a second element from the second image, and wherein the first element is different from the second element, and wherein the combined image highlights the first element and the second element if the combined image is to be processed by a human user.

5. The method of claim 4, wherein the first image includes a second element, and wherein the combined image does not include the second element.

6. The method of claim 1, wherein the first image includes a first element, the method further comprising the step of combining the first image with the second image to form a second combined image, and wherein the second combined image does not include the first element.

7. The method of claim 1, the method further comprising the step of determining that the first image and the second image include a facial image.

* * * * *